United States Patent
Tavanaei et al.

(10) Patent No.: US 12,190,060 B1
(45) Date of Patent: Jan. 7, 2025

(54) MULTIMODAL INPUT TO TEXT TRANSFORMER

(71) Applicant: Amazon Technologies, Inc., Seattle, WA (US)

(72) Inventors: Amirhossein Tavanaei, Mason, OH (US); Karim Bouyarmane, Seattle, WA (US); Ismail Baha Tutar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 190 days.

(21) Appl. No.: 17/937,018

(22) Filed: Sep. 30, 2022

(51) Int. Cl.
*G06F 40/289* (2020.01)
*G06F 16/58* (2019.01)
*G06F 40/169* (2020.01)
*G06F 40/284* (2020.01)

(52) U.S. Cl.
CPC ........ *G06F 40/284* (2020.01); *G06F 16/5866* (2019.01); *G06F 40/169* (2020.01)

(58) Field of Classification Search
CPC ... G06F 40/284; G06F 40/169; G06F 16/5866
See application file for complete search history.

(56) References Cited

U.S. PATENT DOCUMENTS

2018/0012110 A1* 1/2018 Souche ............... G06V 10/454
2019/0306137 A1* 10/2019 Isaacson ............... G06Q 50/01

OTHER PUBLICATIONS

Baevski et al. 2022. Data2vec: A general framework for self-supervised learning in speech, vision and language. arXiv preprint arXiv:2202.03555 (2022).

Bird et al. 2021. Chatbot Interaction with Artificial Intelligence: human data augmentation with T5 and language transformer ensemble for text classification. Journal of Ambient Intelligence and Humanized Computing (2021), 1-16.

Cho et al. 2021. Unifying vision-and-language tasks via text generation. In International Conference on Machine Learning. PMLR, 1931-1942.

Deng et al. 2009. Imagenet: A large-scale hierarchical image database. In 2009 IEEE conference on computer vision and pattern recognition. Ieee, 248-255.

(Continued)

*Primary Examiner* — Ibrahim Siddo
(74) *Attorney, Agent, or Firm* — Knobbe, Martens, Olson & Bear, LLP

(57) ABSTRACT

The present disclosure presents a generative model configured to receive input regarding an item in two different modalities, such as text data and non-text data (including, for example, image or audio data), in order to generate output regarding the item that is determined based on a combination of both modalities' input. Specific relative positional and token type embeddings may be employed in an encoder portion of an encoder-decoder arrangement. An associated decoder may be trained to generate new text corresponding to diverse tasks based on the encoded representation of the two inputs as generated within the encoder. For example, the decoder may be utilized to generate attributes regarding the input item, auto-complete or auto-correct a title or description of the item, among other uses.

20 Claims, 10 Drawing Sheets

(56) References Cited

OTHER PUBLICATIONS

Devlin et al..2018. Bert: Pre-training of deep bidirectional transformers for language understanding. arXiv preprint arXiv:1810.04805 (2018).
Dosovitskiy et al. 2020. An image is worth 16x16 words: Transformers for image recognition at scale. arXiv preprint arXiv:2010.11929 (2020).
Ganguli et al. 2021. Empirical Auto-Evaluation of Python Code for Performance Analysis of Transformer Network Using T5 Architecture. In 2021 8th International Conference on Smart Computing and Communications (ICSCC). IEEE, 75-79.
Gu et al. 2018. Recent advances in convolutional neural networks. Pattern Recognition 77 (2018), 354-377.
Jia et al. Scaling up visual and vision-language representation learning with noisy text supervision. In International Conference on Machine Learning. PMLR, 4904-4916.
Jiang et al. 2021. Exploring listwise evidence reasoning with t5 for fact verification. In Proceedings of the 59th Annual Meeting of the Association for Computational Linguistics and the 11th International Joint Conference on Natural Language Processing (vol. 2: Short Papers). 402-410.
Kiela et al. 2019. Supervised multimodal bitransformers for classifying images and text. arXiv preprint arXiv:1909.02950 (2019).
Kim et al. 2021. Vilt: Vision-and-language transformer without convolution or region supervision. In International Conference on Machine Learning. PMLR, 5583-5594.
Lan et al.. 2019. Albert: A lite bert for self-supervised learning of language representations. arXiv preprint arXiv:1909.11942 (2019).
Lecun et al. 2015. Deep learning. Nature 521, 7553 (2015), 436-444.
Lewis et al. 2019. Bart: Denoising sequence-to-sequence pre-training for natural language generation, translation, and comprehension. arXiv preprint arXiv:1910.13461 (2019).
Li et al. 2021. Align before fuse: Vision and language representation learning with momentum distillation. Advances in Neural Information Processing Systems 34 (2021).
Lin. 2004. Rouge: A package for automatic evaluation of summaries. In Text summarization branches out. 74-81.
Liu et al. 2020. Multilingual denoising pre-training for neural machine translation. Transactions of the Association for Computational Linguistics 8 (2020), 726-742.
Liu et al. 2019. Roberta: A robustly optimized bert pretraining approach. arXiv preprint arXiv:1907.11692 (2019).
Logan et al., Multimodal Attribute Extraction, 31st Conference on Neural Information Processing Systems (NIPS 2017), Long Beach, CA.
Lu et al. 2019. Vilbert: Pretraining task-agnostic visiolinguistic representations for vision-and-language tasks. Advances in neural information processing systems 32 (2019).
Mastropaolo et al. 2021. Studying the usage of text-to-text transfer transformer to support code-related tasks. In 2021 IEEE/ACM 43rd International Conference on Software Engineering (ICSE). IEEE, 336-347.
Muda et al. 2010. Voice recognition algorithms using mel frequency cepstral coefficient (MFCC) and dynamic time warping (DTW) techniques. arXiv preprint arXiv:1003.4083 (2010).
Qudar et al. Tweetbert: A pretrained language representation model for twitter text analysis. arXiv preprint arXiv:2010.11091 (2020).
Radford et al. 2021. Learning transferable visual models from natural language supervision. In International Conference on Machine Learning. PMLR, 8748-8763.
Raffel et al. 2019. Exploring the limits of transfer learning with a unified text-to-text transformer. arXiv preprint arXiv:1910.10683 (2019).
Reimers et al. 2019. Sentence-bert: Sentence embeddings using siamese bert-networks. arXiv preprint arXiv:1908.10084 (2019).
Ren et al. 2015. Faster r-cnn: Towards real-time object detection with region proposal networks. Advances in neural information processing systems 28 (2015).
Shao et al. 2019. Transformer-based neural network for answer selection in question answering. IEEE Access 7 (2019), 26146-26156.
Shaw et al. 2018. Self-attention with relative position representations. arXiv preprint arXiv:1803.02155 (2018).
Souza et al. 2019. Portuguese named entity recognition using BERT-CRF. arXiv preprint arXiv:1909.10649 (2019).
Tan et al. 2019. Efficientnet: Rethinking model scaling for convolutional neural networks. In International conference on machine learning. PMLR, 6105-6114.
Vaswani et al. 2017. Attention is all you need. Advances in neural information processing systems 30 (2017).
Xue et al. 2020. mT5: A massively multilingual pre-trained text-to-text transformer. arXiv preprint arXiv:2010.11934 (2020).
Zeng et al. 2021. Multi-Grained Vision Language Pre-Training: Aligning Texts with Visual Concepts. arXiv preprint arXiv:2111.08276 (2021).

\* cited by examiner

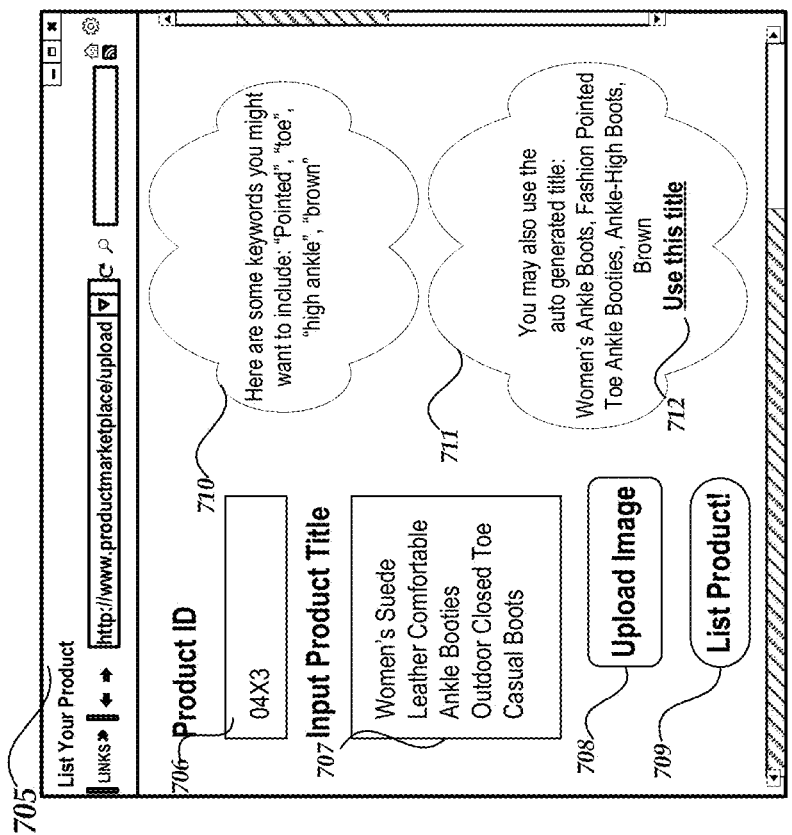
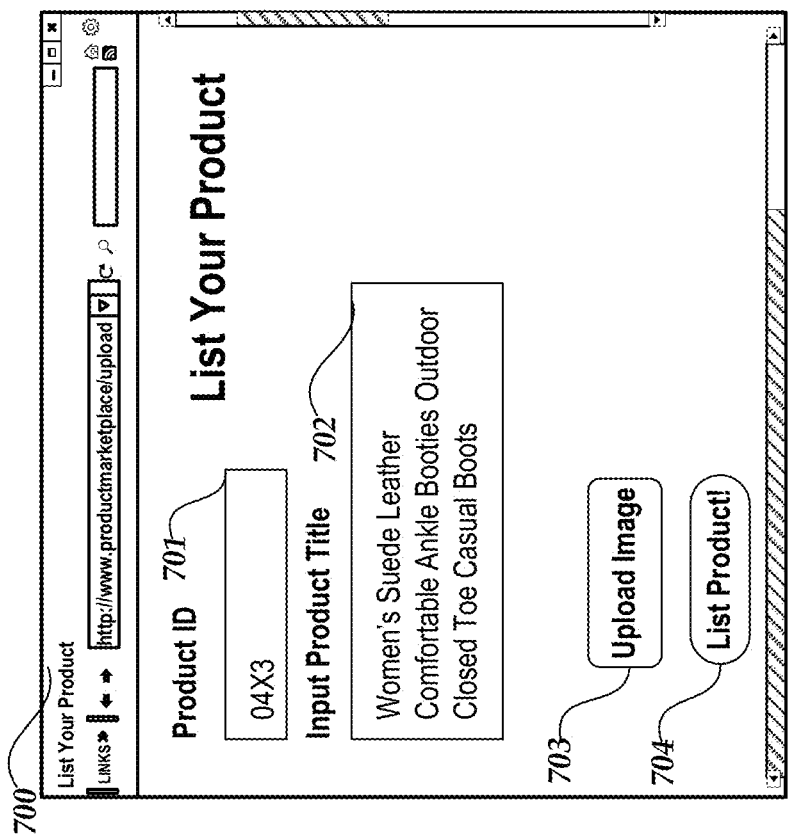
FIG. 7B
FIG. 7A

MULTIMODAL INPUT TO TEXT TRANSFORMER

BACKGROUND

Sequence-to-sequence (often abbreviated to seq2seq) models have been employed for various tasks. For example, a sequence-to-sequence model that includes an encoder and decoder pairing is a popular arrangement for transforming input text in one language (such as English) to text output in another language (such as French), among many other uses that have been employed. For tasks related to Natural Language Understanding (NLU) or Natural Language Processing (NLP), separate fine-tuning and model customization is often required to provide narrowly focused models for tasks such as attribute generation, attribute correction, title completion, and validation of input text data, among others. Additionally, for many classification tasks, the number of classes in many existing models is pre-defined and the model is then retrained after adding any new label to the task. Existing multimodal networks have performed well in learning from joint or individual modalities, but they typically inherit the same limitations in multi-task learning and unseen label recognition.

BRIEF DESCRIPTION OF DRAWINGS

Embodiments of various inventive features will now be described with reference to the following drawings. The drawings are provided to illustrate example embodiments described herein and are not intended to limit the scope of the disclosure.

FIG. 7A illustrates a user interface via which a user may provide a title and image of an item to be added to an electronic catalog.

FIG. 7B illustrates a user interface that may be presented after a user submission of a title and image of an item, which presents generated textual attribute and title suggestions according to methods described herein.

DETAILED DESCRIPTION

Figure 1:
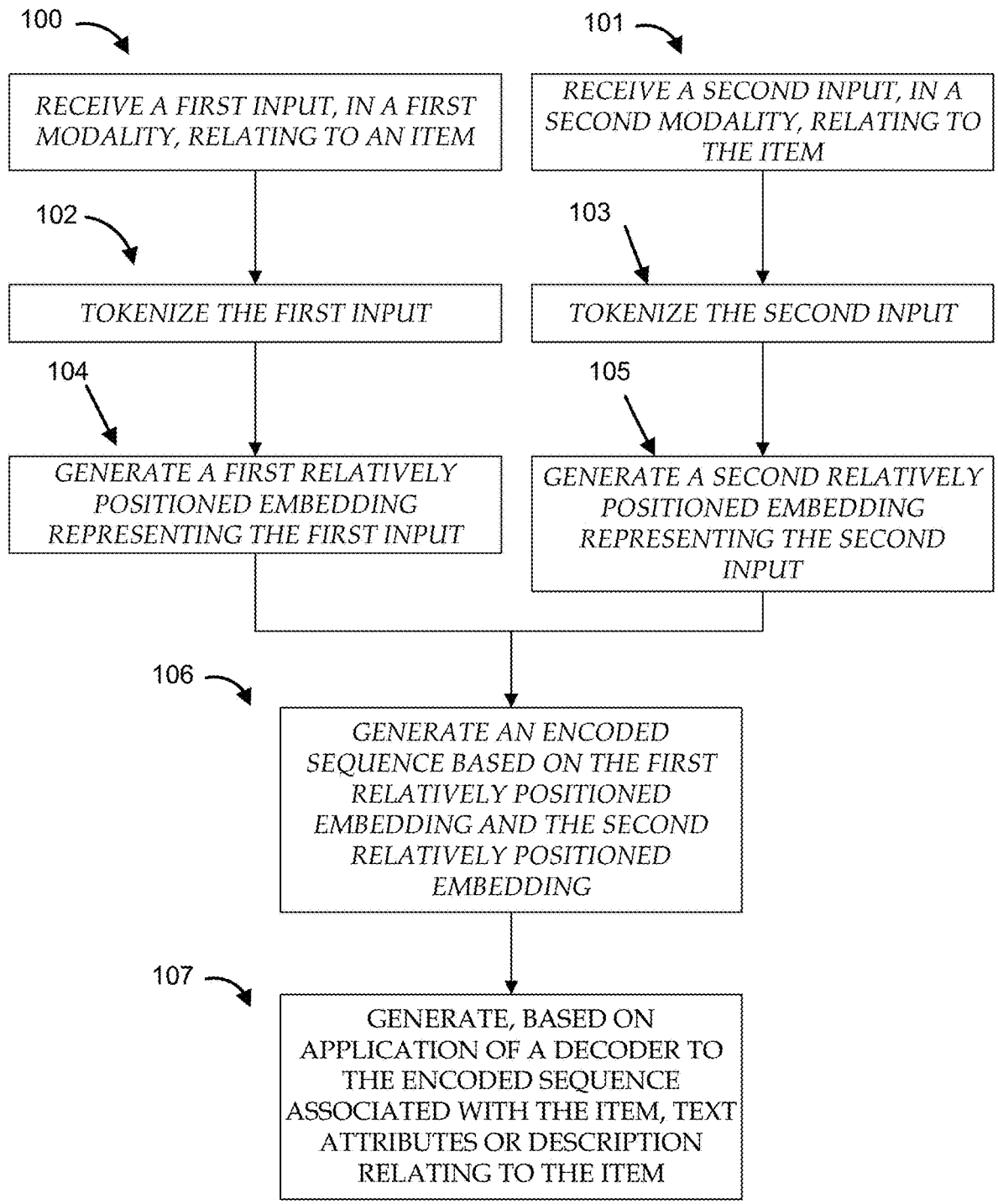
FIG. 1 is a flow diagram of an illustrative method for using a machine learning framework as described herein for generating text relating to an item.

Generally described, aspects of the present disclosure relate to machine learning-based approaches to the generation of attributes or other output regarding an item, such as a product available in an electronic catalog, based on input regarding the item in the form of both text and non-text modalities. For example, image data is one example of a non-text modality according to some embodiments of the present disclosure. One of the issues in attribute generation/extraction from an item title (and similarly an item description) is often the lack of relevant information pinpointing the attributes. For instance, generating the "sleeve-type" attribute from a shirt's title (among other text-based descriptions) that does not reveal any information about the sleeve type of the shirt is extremely challenging. Previous attempts to output item attributes have tended to focus on single modality, text-only input generative models. Incorporating another modality (such as an image of the item) into the system can overcome this difficulty as discussed below, but requires changes to existing model approaches.

Recent studies have demonstrated the ability of generative models, either auto-regressive models or sequence-to-sequence models, to reach state-of-the-art performance on various Natural Language Understanding (NLU) and Natural Language Processing (NLP) tasks. They typically operate by framing all the tasks in a single formulation: text auto-completion or text-to-text encoding-decoding. Generative models have been applied to the tasks of product data generation and completion to generate the content of missing or incorrect item attributes based on the other textual information. The present disclosure presents a new generative model to involve different modalities (such as text and visual modalities, where image data is one example of a visual modality). The described model in some embodiments may be considered an encoder-decoder model with a foundation in existing Text-To-Text Transfer Transformer ("T5") architecture and methods, but with significant modification that allows non-text components to be fused to the text tokens. Specific relative positional and token type embeddings may be employed in the encoder portion of an encoder-decoder arrangement. An associated decoder may be trained to generate new text corresponding to diverse tasks based on the encoded representation of the two inputs as generated within the encoder. For example, the decoder may be utilized to generate attributes regarding the input item, or to auto-complete or auto-correct a title or description of the item, among other uses or tasks.

Encoder-based transformers have been customized to encode other modalities and use the self-attention mechanism in multimodal settings. There exists a series of multimodal transformers that perform early/late fusion in vision and language modeling such as VILBERT and ALBEF, or two-tower vision and language models such as CLIP. These multimodal networks have generally performed well in learning from joint or individual modalities, but their encoder-only nature limits them in downstream multi-task learning and unseen label recognition. Downstream multi-task learning, as addressed by aspects of the present disclosure, entails that the model and most of its parameters are shared across multiple tasks.

Disclosed herein is a new generative model to encode inputs regarding an item in different modalities and generate desired output text(s) using a model that addresses the deficiencies in existing frameworks for text generation. The proposed model architecture employs aspects of T5 with significant modification by which non-text (e.g., image, audio, or others) components may be fused to text tokens with specific relative positional and token type embeddings in the encoder of an encoder-decoder arrangement, while the decoder generates new text corresponding to diverse tasks specified by keywords, such as one or more prompts within the input.

The foundation T5 is an encoder-decoder model where the encoder is composed of a stack of identical layers. Each layer has two sub-layers. The first is a multi-head self-attention mechanism, and the second is a position-wise fully connected feed-forward network. The T5 encoder employs a residual connection around each of the two sub-layers, followed by layer normalization. That is, the output of each sub-layer is LayerNorm (x+Sublayer (x)), where Sublayer (x) is the function implemented by the sub-layer itself and LayerNorm is the normalization layer. To facilitate these residual connections, all sub-layers in the model, as well as the embedding layers, may produce outputs of dimension $d_{model}$=512, in some embodiments.

The decoder may also be composed of a stack of identical layers. In addition to the two sub-layers in each encoder layer, the decoder may include a third sub-layer, which performs multi-head attention over the output of the encoder stack. Similar to the encoder, the T5 decoder employs residual connections around each of the sub-layers, followed by layer normalization. Relative to T5, aspects of the present disclosure include modifying the self-attention sub-layer in the decoder stack to prevent positions from attending to subsequent positions. This masking, combined with fact that the output embeddings are offset by one position, may be employed to ensure that the predictions for a position can depend only on the known outputs at positions less than it.

FIG. 1 is a flow diagram of an illustrative method for item attribute generation using a sequence-to-sequence generative model disclosed herein, according to some embodiments. The method may be implemented by one or more computing systems, such as computing system 1002 which will be described below with respect to FIG. 10. In some embodiments, a computing system other than the system that trains the model may later utilize the trained model to generate item attributes. In other embodiments, the same computing system may train and later use the machine learning model or framework.

The illustrative method begins at block 100, where the system 1002 may receive (e.g., from a user via a user interface, or by retrieving data from a data store) a first input in a first modality. For example, in some embodiments, a user may utilize a user interface to provide the first input, where the user is a seller of an item and the first modality is image data. This image data may depict an item that the seller wishes to upload into an e-commerce catalog. In an embodiment, the seller uploads a second input in a modality such as text data relating to the item at block 101. In some embodiments, in addition to text data describing or text data about the item, the text data input may also include one or more prompts indicating the task or output type desired (e.g., a particular attribute to be generated, such as shirt style, or a question to be answered by the decoder regarding the item). Blocks 100 and 101 may occur sequentially or in parallel, depending on the embodiment. In other example use cases, one or both inputs may be from data sources other than a user or user interface, such as in instances in which the method is run in a batch manner to modify or correct data previously stored in an electronic catalog or other database. The first and second inputs are subsequently tokenized at blocks 102 and 103 (which may be implemented in parallel or sequentially), respectively, in manners based on their respective modalities, as will be further described below with respect to FIG. 5.

At blocks 104 and 105, which may be implemented in parallel or sequentially, relatively positioned embeddings are generated, where a first embedding represents the first input and the second embedding represents the second input, as will be further described below. In some embodiments, the relative position embeddings each incorporate token type identifiers that identify the particular modalities of the respective input. For example, the first embedding may include a bit or other indicator that has been assigned within the encoder-decoder pairing to represent the text modality, while the second embedding may include a bit or other indicator that has been assigned to represent the image modality.

In some embodiments, the combination of the two relatively positioned embeddings is used by the encoder to generate, within a plurality of layers of the encoder, an encoded sequence associated with the item at block 106. The encoded sequence, which may be generated at the last hidden state within the encoder, is then provided as input into a decoder that has been jointly trained with the encoder in a task-agnostic manner, where the decoder may include a sequence-to-sequence generative machine learning model. In some embodiments, the architecture of the decoder may be similar to existing T5 approaches but may be trained in an end-to-end manner with the encoder with respect to multimodal inputs, as described herein. At block 107, the application of the decoder to the encoded sequence, associated with the item outputs text depending on the specified task and/or prompt in the given instance. For example, the output may include textual attributes regarding the item (e.g., color, size, brand, characteristics, etc.), a suggested textual description or title, and/or other information regarding the item depending on the prompts within the input and/or based on the use case for which the model has been trained.

Figure 2:
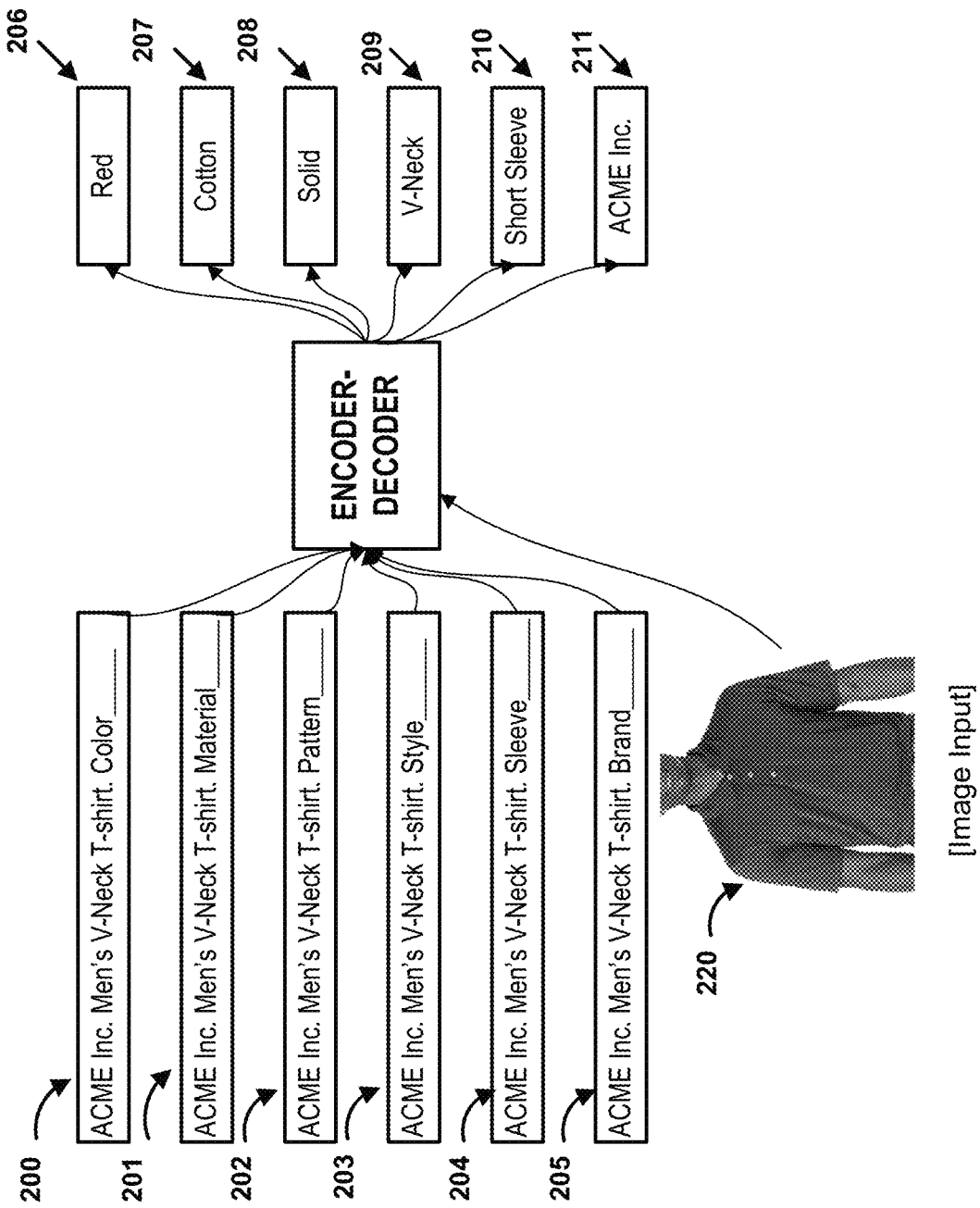
FIG. 2 depicts an example transformation of text and image inputs into textual attributes of the item, in this case a t-shirt, as output.

FIG. 2 shows an instance of generating attributes using text and image data through the application of the trained encoder-decoder pairing described herein, which may be referenced as MMT4 (Multi-Modality To Text Transfer Transformer). The attributes selected for the attribute generation task in the illustrated example of FIG. 2 are color, material, pattern, style, sleeve-type, and brand, as indicated by the prompt portions (e.g., "Color_" in input text 200 being considered a prompt portion of the input text 200) in the input texts 200-205. These attributes are the examples of attributes that may be discovered from the image if the attribute is not in the text input (title). The number of samples for each task may be different from other tasks because not all attributes are valid for all items (for instance, shoes do not have sleeve-type).

One of the difficulties in attribute generation/extraction from an item title (and/or item description) is the lack of relevant information pinpointing the attributes. For instance, generating the "sleeve-type" attributes from a shirt's title (such as "ACME Inc. Men's V-Neck T-shirt" in the example of FIG. 2) that does not reveal any information about the sleeve type of the shirt is extremely challenging. However, the other input in the image modality, in this case an image 220 depicting the shirt as a photograph, visually depicts the shirt and thus the sleeve length can be determined from analysis of the image data (e.g., based on image features determined by a convolutional neural network, in some embodiments).

In the example of FIG. 2, the decoder's output 206-211 each correspond to a respective prompt (in the displayed order) in the corresponding text inputs 200-205. As shown, the encoder-decoder pairing has been used to determine that the shirt is red and short sleeve (which cannot be determined with high confidence by the text input alone) and that the shirt is made of cotton and from the brand ACME Inc. (which might not be able to be determined with high confidence from the image alone).

Figure 3:
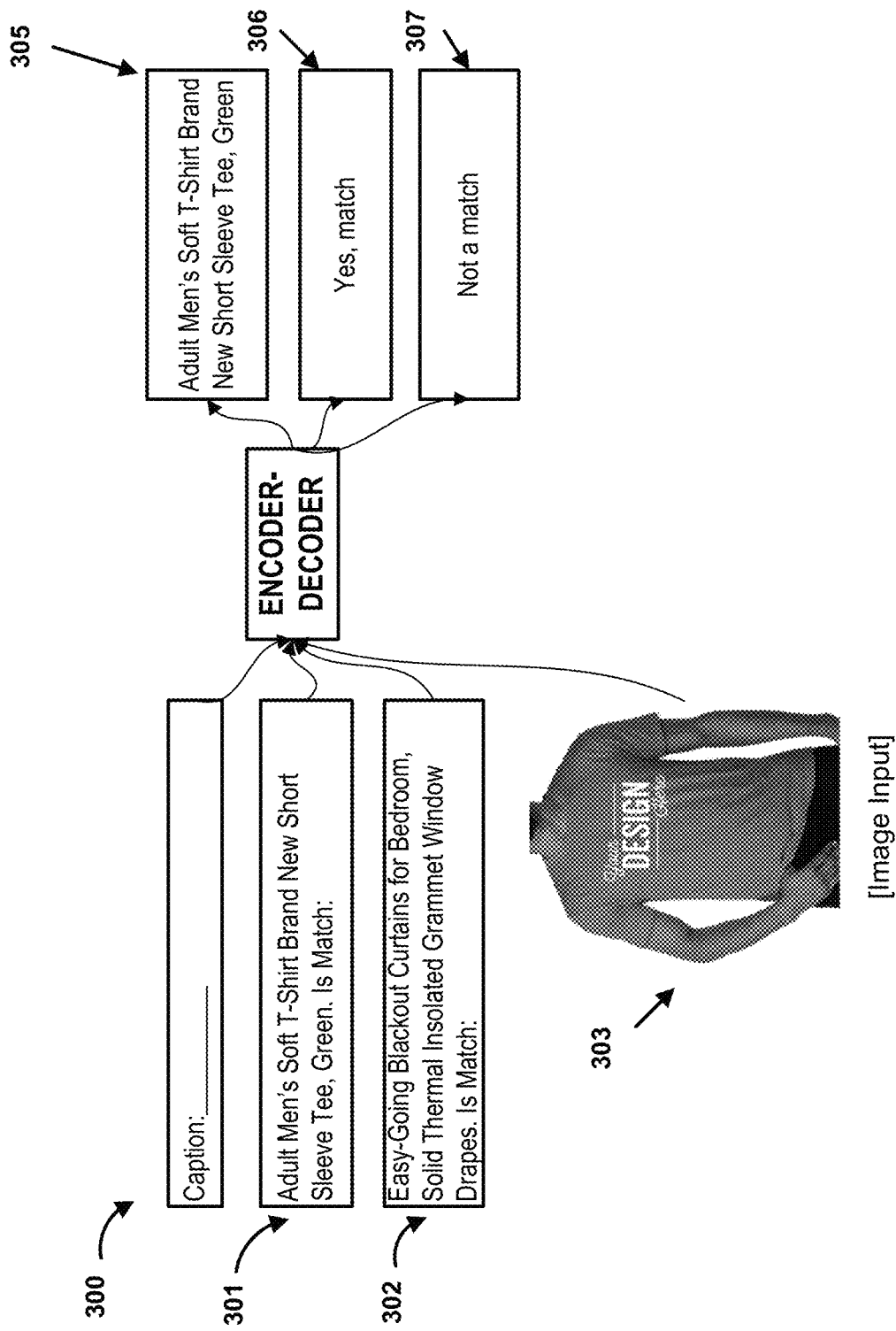
FIG. 3 provides another example transformation of text and image inputs where image input provides information to compensate for the lack of information in the text.

FIG. 3 provides another example transformation of text and image inputs where image input provides information to compensate for the lack of information in the text. As shown, text input 300 prompts the encoder-decoder for an item caption (or title). The respective output 305 provides a title based on a combination of the multimodal inputs 300-303. The output 306 indicates that the title text provided in input 301 is a match or is consistent with the image input 303 (e.g., the features in the image of a green shirt match the text title or description provided in text input 301). Conversely, the output 307 indicates that the title text provided in input 302 is not a match or is inconsistent with the image input 303 (e.g., the features in the image of a green shirt do not match the text title or description of curtains provided in text input 302). This example illustrates that the single encoder-decoder pairing may be trained to perform more than one task, in this case being trained to respond both to a prompt requesting title/caption generation and to a prompt requesting whether input text and image data match.

Figure 4:
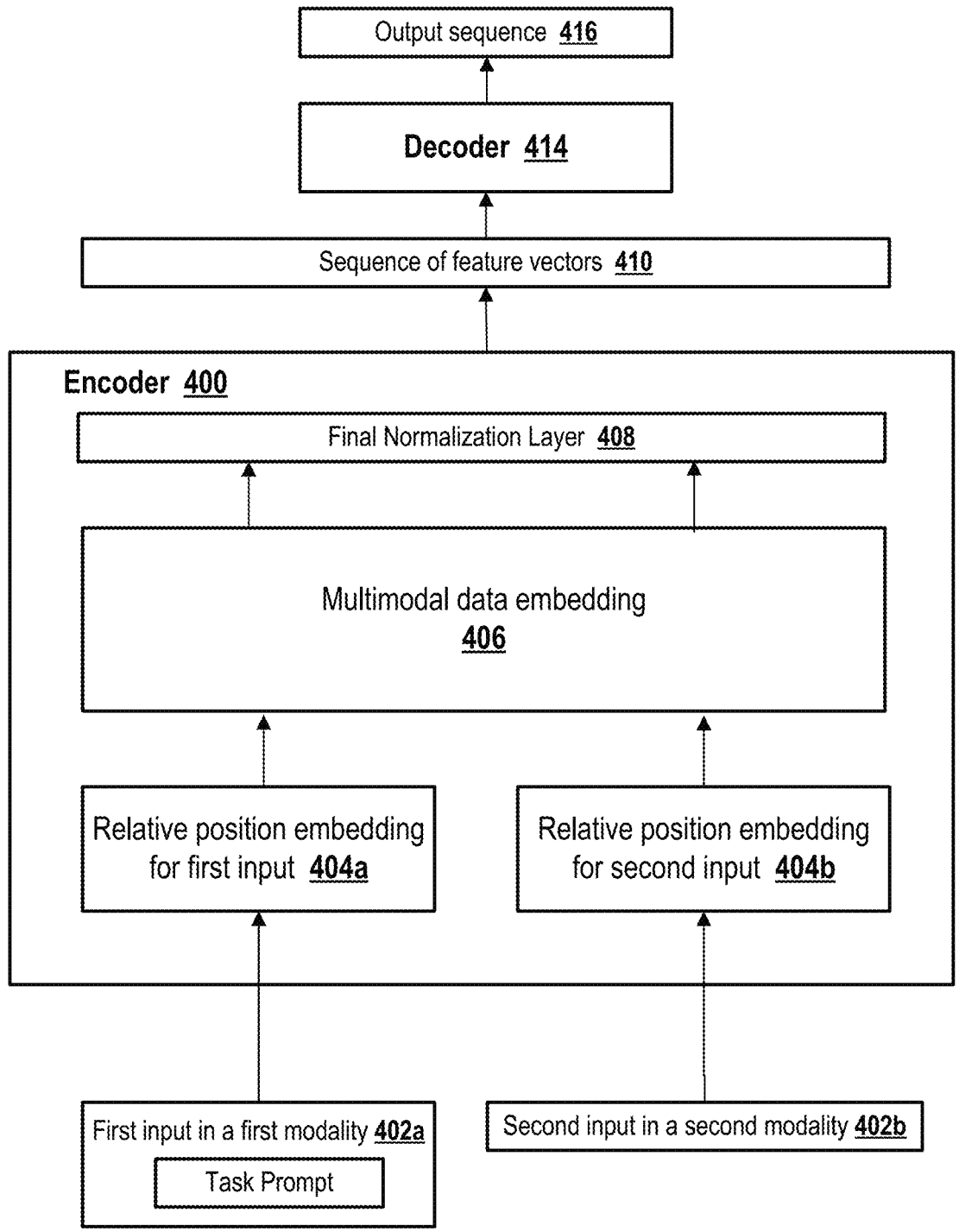
FIG. 4 is an illustrative high-level diagram of the architecture of the system for transforming multimodal inputs via an encoder and decoder of a sequence-to-sequence model described herein.

FIG. 4 is an illustrative high-level diagram of an architecture for transforming multi-modal inputs via an encoder and decoder of a sequence-to-sequence model described herein, according to some embodiments. FIG. 4 generally illustrates layers and data within the encoder-decoder pairing at a high level, while more detailed components, layers and examples with respect to text and image modalities specifically will be described further below with respect to FIG. 5.

As shown in FIG. 4, a first input 402a in a first modality, and a second input 402b in a second modality may be provided as input to the encoder 400. As illustrated, the first input 402a may include, in addition to information regarding the item, a task prompt that may be in the form of natural language (such as one or two words of text that indicate the task desired of the decoder). The encoder 400 may generate relatively positioned embeddings 404a and 404b for the respective modalities' inputs, which may then be fused or otherwise combined by the encoder 400 into multimodal data embedding 406, as will be further discussed below. The representation, sequence or encoding of the item data generated within a final layer within the encoder 400, such as at a final normalization layer 408, may be provided to the decoder 414, such as in the form of a sequence of feature vectors 410 representing the multimodal input 404a and 404b. The decoder 414 then generates the final output sequence 416 based on the input, prompt(s) and/or task(s) indicated in the input data.

Figure 5:
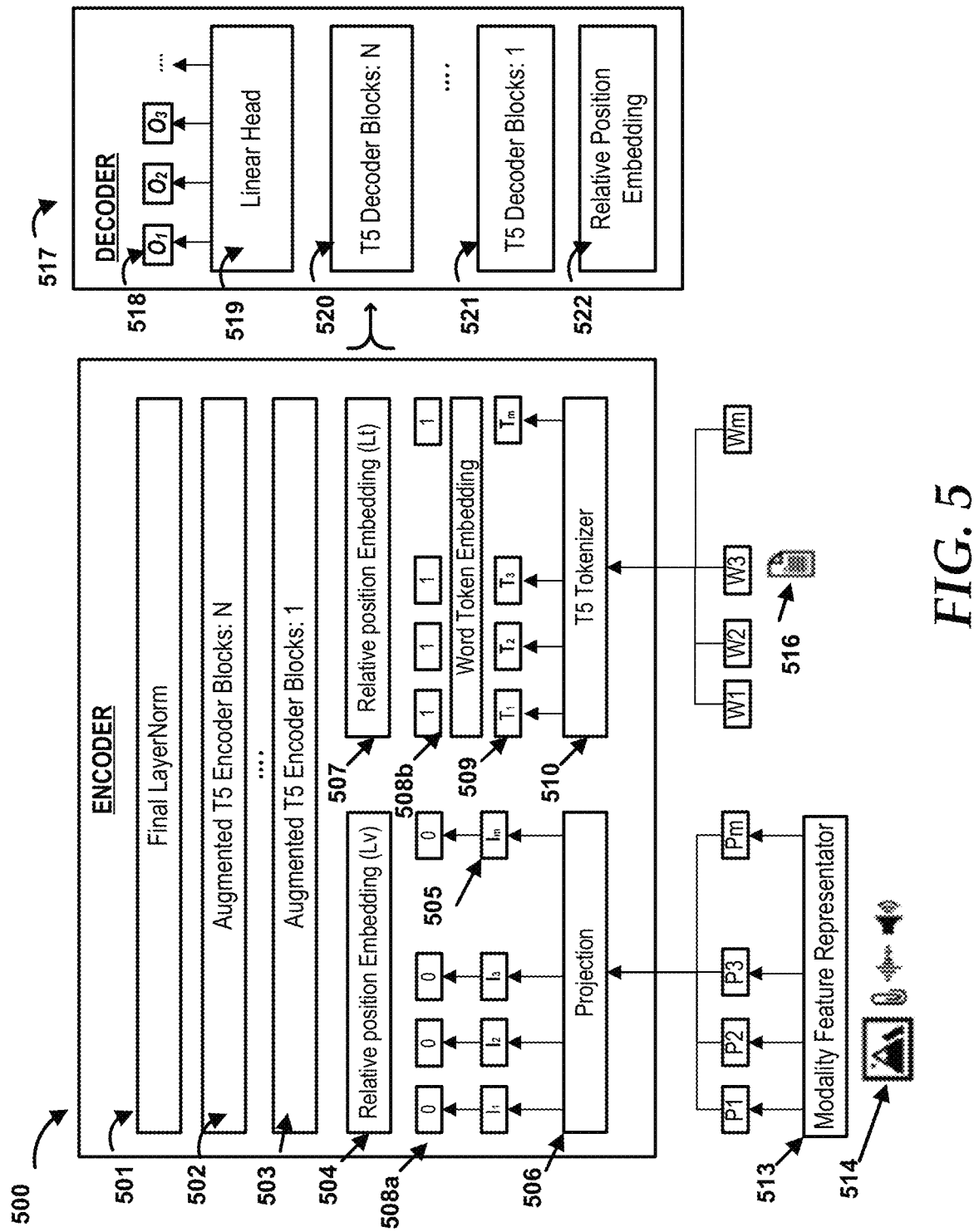
FIG. 5 is an illustrative depiction of a more detailed architecture and data flow of the system for transforming multimodal inputs into textual output using a generative model according to certain embodiments.

FIG. 5 is an illustrative depiction of a more detailed architecture and data flow of the system for transforming multi-modal inputs into textual output using a generative model according to certain embodiments. A single non-text input 514, such as in the form of an image, voice signal, an audio file, a video recording, a binary file, or other modality is provided (such as uploaded by a user via the user interface 700 to be described below) to a modality feature representator 513, which pre-processes the non-text input and extracts a sequence of feature vectors representing the input 514 in a manner that may depend on the specific type or modality of input.

The specific manner in which the modality feature representator processes the input may depend on the specific modality, form or format of the input, and there may be different representators that are selected from in a given instance depending on the modality of the input. For instance, if the modality of input data 514 is image data, the image input can be divided into flattened image patches. Alternatively, a voice signal can be represented by a number of Mel Frequency Cepstral Coefficient (MFCC) feature vectors. In different implementations or embodiments, different approaches to image feature representation may be taken, such as but not limited to: (1) transforming image data to flattened image patches, (2) utilizing a Vision Transformer (ViT) model, or (3) utilizing an EfficientNet-B4 convolutional network or other convolutional neural network (CNN) to extract image features. The "Projection" component 506 adjusts the modality feature vector dimension to the T5 hidden layer dimension (e.g. 768 for T5-base) using a linear layer followed by a normalization layer (LayerNorm) 501.

In some embodiments, the Projection component 506 adjusts the modality feature vector's dimensions before labeling the vectors with modality-specific bits (zeroes representing the image modality in the example at layer 508a, and ones representing the text modality in the example of layer 508b) in preparation for mapping into relatively positioned embeddings 504.

At this point, the new modality's input features are ready to be passed to the embedding and transformer layers next to the embedded text tokens. Eq. 1 shows the modality component (Pi) obtained by the modality (V) feature representator (fv) that is projected by a linear neural network ($W_{proj}$) followed by normalization, $\gamma$.

$$P_i = f_v(V)_i, I_i = \gamma(W_{proj} \cdot P_i) \quad (1)$$

The token type (segment) embedding (SE) in this architecture separates different modalities and helps the model distinguish information flow from different input segments. Each modality in this architecture gets a unique token type id (in this figure, zero or one).

The text input 516 is tokenized in an analogous method to T5's process for preprocessing text 510 where the tokens 509 are converted into word token embeddings and labeled with modality-specific bits such as "1" to set the data apart from the "0" of non-text input.

The converted output is mapped into relatively positioned embeddings 507 that, in contrast to absolutely positioned embeddings, account for the critical property of language and text input to effectively build the learning model.

The embedded inputs for the text (Xt) and the other modality (Xv) are concatenated to prepare a single sequence fed to the T5 encoder.

$$X_i^0 = I_i + SE \quad (0)$$

$$X_i^t = WE(T_i) + SE \quad (1),$$

where WE is the word embedding.

The disclosed model may also employ the relative positional embedding (RPE) computed according to the input length for each input segment/modality and is incorporated in the self-attention computation. The positional embedding may utilize the relative pairwise distance between tokens so that it can handle long sequences and better generalize to sequences with different lengths than the lengths seen in the training data. The RPE of the input vectors may be shared with the other encoder blocks, in some embodiments.

The embedded features may then be concatenated and fed to the encoder layers, which may include multi-head self-attention layers. The last hidden state of the encoder is a sequence of $(L_v+L_t)D_h$-dimensional feature vectors passed to the decoder as key-value for the cross-attention calculation in the decoder layers.

The linear head 519 of the decoder section maps the decoder's last hidden state to output tokens 518 based on casual language modeling masking. In this embodiment, the decoder's focus is on text generation. In other embodiments where other modality generation is expected (e.g., decoder output in a modality other than text), a different linear head may or may not be used according to the modality type and the task. It will be appreciated that the architecture of the T5-labeled components (e.g., at layers 502 and 503 of the encoder, and 520 and 521 of the decoder) may be configured similarly to existing T5 approaches, though the relatively positioned embedding 522 reflects the multimodal input of the model described herein rather than only text input as would be typical in existing T5 approaches. For example, the augmented T5 encoder blocks 502 and 503 may be modified or augmented with respect to similar blocks in existing T5 approaches in order to handle modified arguments, key values and/or masking differences to support multimodal input.

In some embodiments, the modalities used in the training are an item's title and image, where the image modality may be represented by the three approaches mentioned earlier. In one example, the training dataset may include over a million items' titles and their corresponding images, and the validation dataset may include roughly 5,000-10,000 items' titles and corresponding images (where the items in the training and validation dataset are different). In such an example, pre-training and fine-tuning tasks can be performed using training hyper-parameters with learning rate=2e-4 decayed linearly, training epochs=2, and batch size=288, for example.

Figure 6:
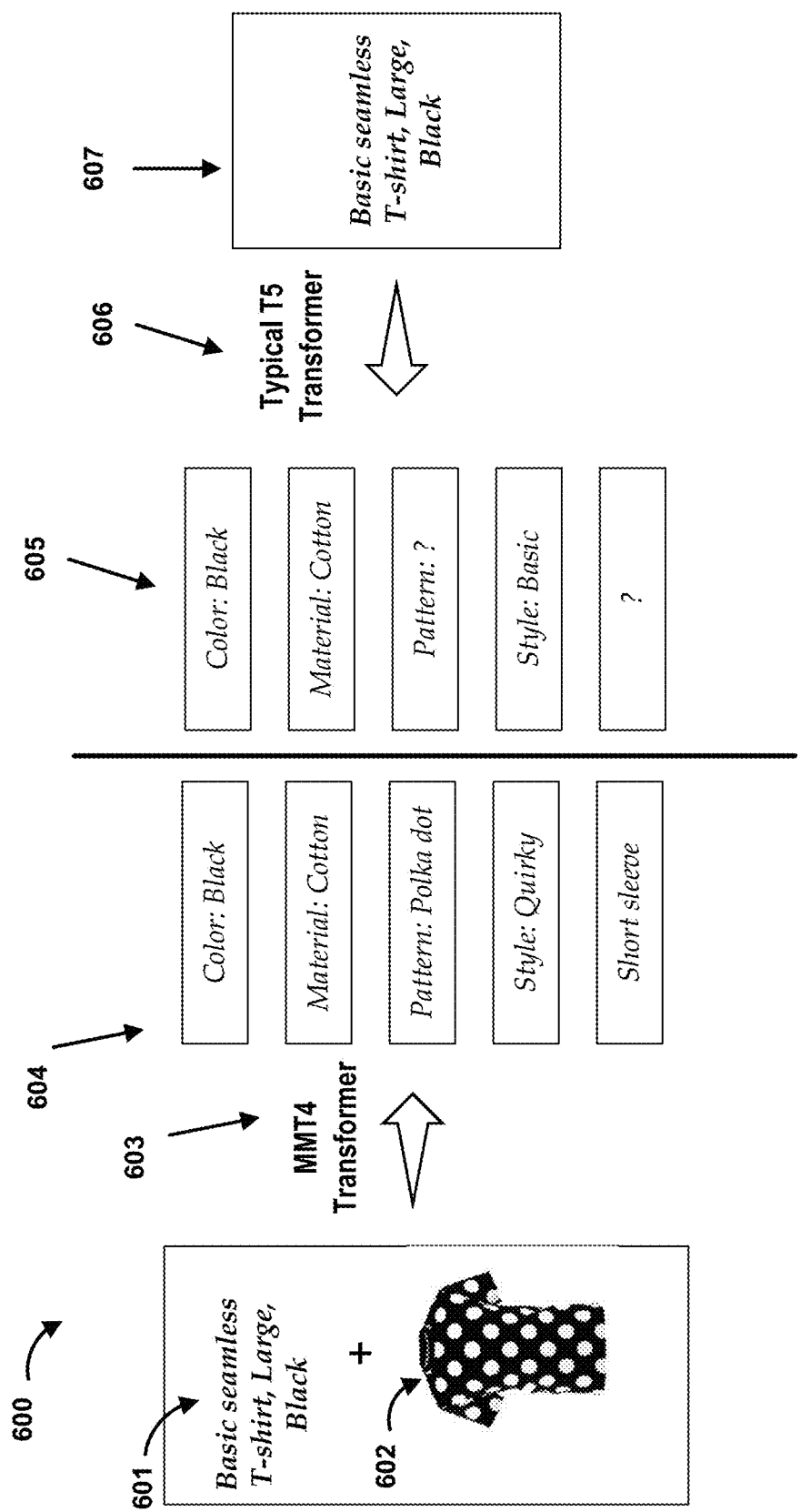
FIG. 6 illustrates a comparison of sample output from the machine learning framework described herein, according to some embodiments, with sample output of a previously implemented text-only neural network model.

FIG. 6 illustrates a performance evaluation of textual output from the machine learning framework described herein, according to some embodiments, with sample output of a benchmark. T5, neural network model. In this case, the T5 model 606, which forms foundational blocks of the MMT4 model 603 described herein, is used to generate sample output 605 (when provided with input text 607) after being trained using the same data as the data used to train the embodiment of the present disclosure 603 that generated the textual attribute output 604 (when provided with input text 601 and image 602). As can be seen in FIG. 6, textual data 601 and image 602 are provided as input into the MMT4 model 603 described herein to produce a complete textual output describing item attributes, such as the pattern and the sleeve type, that the T5 model 606 was not able to determine from the text input 607 alone (where such text input 607 is identical to text input 601 provided to the MMT4 model 603).

FIG. 7A is an illustrative user interface 700 that may be generated by the computing system 1002 for display via a browser application or other application operating on the user device 1003 (to be described further below with reference to FIG. 10), to complete a title attribute as a seller is uploading an item to be listed for sale in an electronic catalog. For example, the user interface 700 may be generated by the computing system 1002 for display via a browser application or other application operating on the user device 1003, or alternatively may be generated at least in part by an application operating on the user device 1003 based on data and/or images received from the computing system 1002 over a network, such as the Internet.

The user interface 700 prompts the user, who could be the seller of an item, to enter a Product ID in field 701 identifying the item being uploaded. The user interface also prompts the user to enter a tentative product title 702 as text (in a textual modality). In one exemplary embodiment, the user interface 700 provides the user the ability to upload or otherwise provide an image file by selecting option 703 before choosing to list the product by selecting option 704. As shown, the user has entered text into fields 701 and 702, but not yet uploaded an image file via user interface 700.

FIG. 7B illustrates a user interface 705 that may be presented after a user submission of a title and image of an item. As shown, user interface 705 presents generated textual attribute suggestions 710 and title suggestion 711 that were generated according to methods described herein. For example, after the user uploaded image 708 via user interface 705, the system (such as computing system 1002 described below) may have provided the user-provided Product ID text input 706, Product Title text input 707, and image input 708 as input to a multimodal encoder-decoder arrangement as described herein that has been previously trained to complete tasks that include item attribute generation and item title generation. The output of the decoder in this case may have been the item attributes listed in textual attribute suggestions 710 and the title shown in title suggestion 711. The user may select the "Use this title" option 712 to automatically apply the system's suggested title for the item rather than the user-submitted title previously typed in field 802 by the user.

Figure 8:
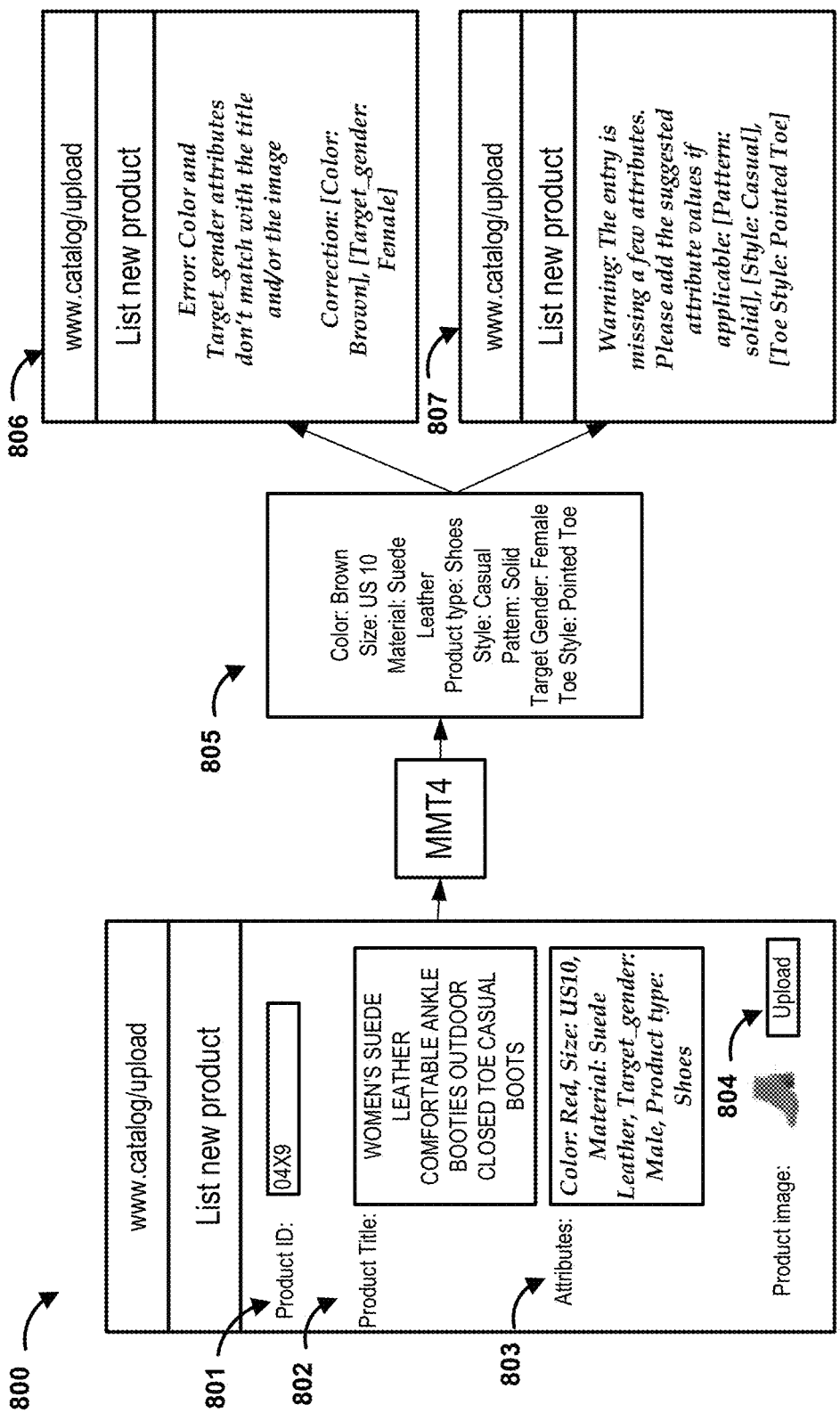
FIG. 8 depicts an example of attribute suggestion and correction based on image and text inputs.

FIG. 8 illustrates an exemplary embodiment of a user interface 800 providing a user, who might be a seller, the ability to upload or type text input for the item identifier 801, item title 802, and attributes 80,3 along with an image 804 of an item to be listed for sale or added to an electronic catalog. The two inputs of text and non-text modalities are transformed via a generative model to output attributes 805 associated with the text and image. The additional modality provided by the image input improves the model's performance by generating attribute suggestions such as the "Toe Style" 805 which was not available with just the text input. In other embodiments, a non-shoe item such as a watch uploaded by the seller with image and text inputs may generate other types of attributes and values. A watch may, in some embodiments, generate attributes such as "Item Shape", "Display Type", or "Bezel Material" instead of "Toe Style" or other extant attributes for another item. Attribute values missing from the input text are also suggested to be added with seller intervention if deemed appropriate via a prompt or user interface message 807.

Figure 9:
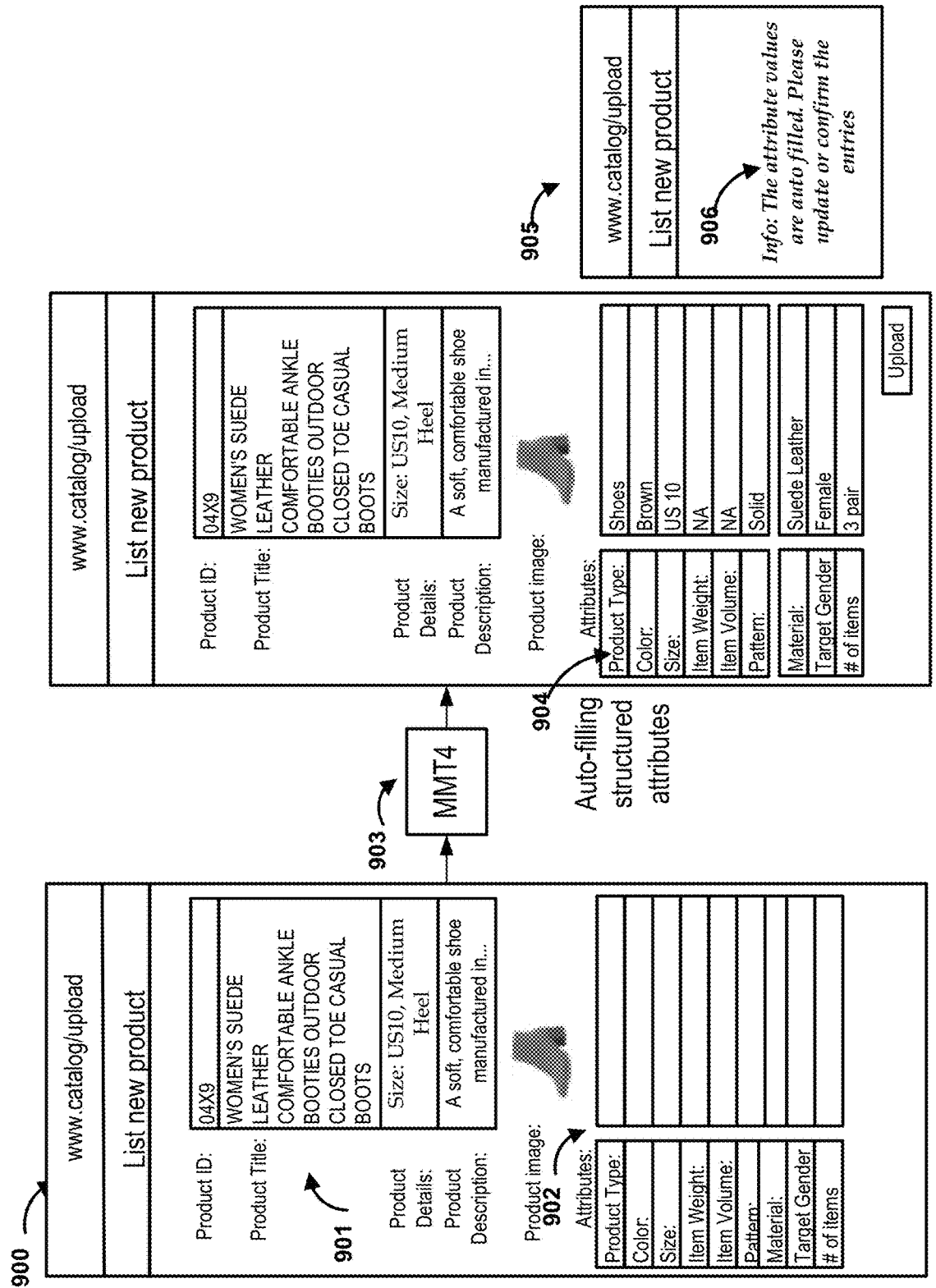
FIG. 9 depicts an example of auto-filling the attribute values for an item being added to an electronic catalog based on image and text inputs.

FIG. 9 provides another example of a user interface 900 providing a user an ability to upload text and image inputs where the image input compensates for the lack of information in the text input. As shown, a user, in this embodiment a seller, enters text input 901 for the title, detail, and description of the item. The desired attributes 902 are determined using the MMT4 model 903 to fill in the attribute values associated with the item in listing fields 904, which may be presented to the user. This reduces the listing burden for the seller and improves the user experience as a table of attributes is generated with only a few input text attributes from the seller. The user interface provides a popup box 905 indicating the option for the seller to confirm that appropriate attribute values have been auto-filled (shown in message text 906).

Figure 10:
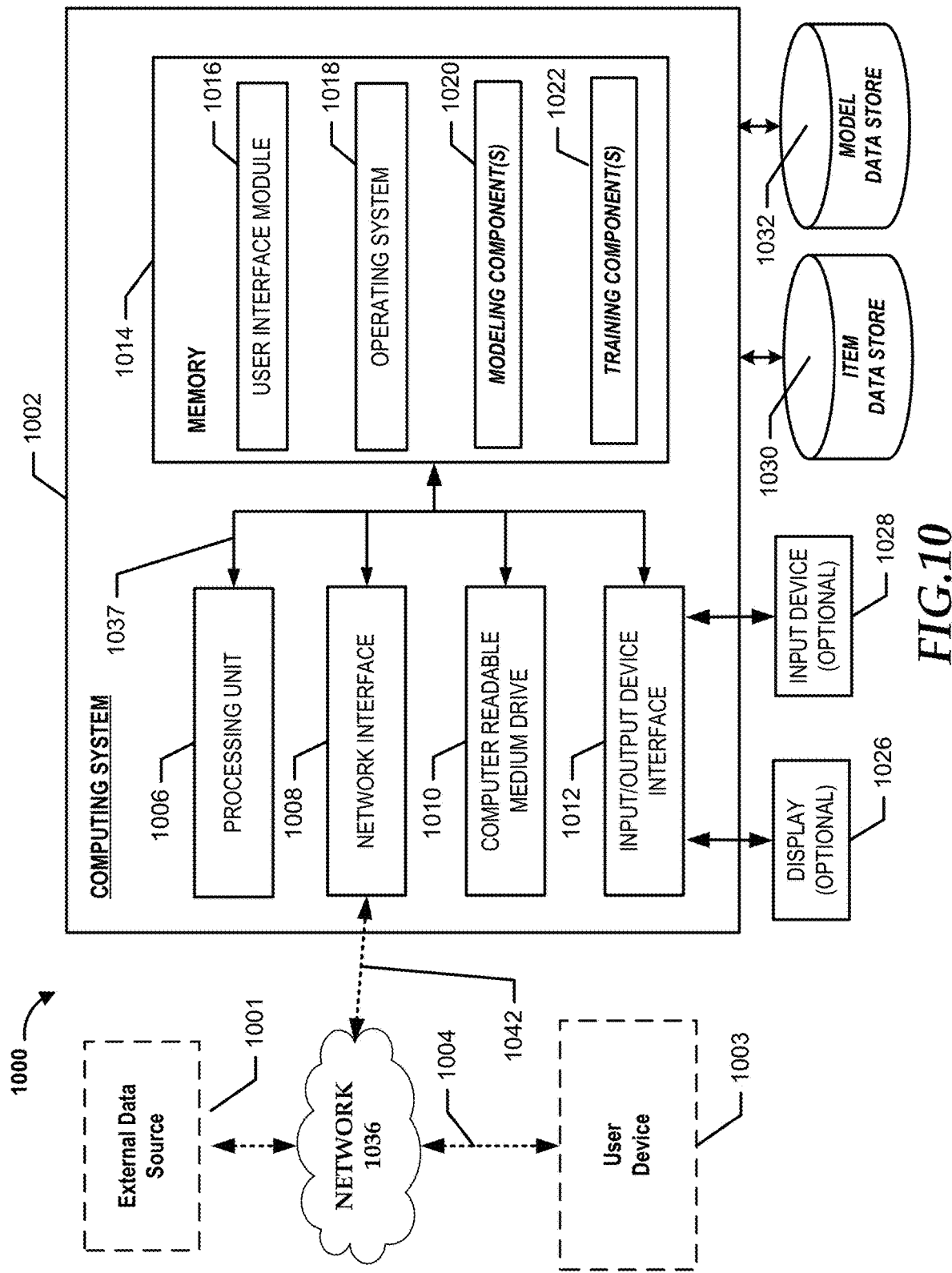
FIG. 10 is a block diagram depicting an illustrative architecture for a computing system that may implement one or more of the features described herein.

FIG. 10 illustrates a general architecture of a computing environment 1000, according to some embodiments. As depicted in FIG. 10, the computing environment 1000 may include a computing system 1002. The general architecture of the computing system 1002 may include an arrangement of computer hardware and software components used to implement aspects of the present disclosure. The computing system 1002 may include many more (or fewer) elements than those shown in FIG. 10.

As illustrated, the computing system 1002 includes a processing unit 1006, a network interface 1008, a computer readable medium drive 1010, an input/output device interface 1012, an optional display 1026, and an optional input device 1028, all of which may communicate with one another by way of a communication bus 1037. The processing unit 1006 may communicate to and from memory 1014 and may provide output information for the optional display 1026 via the input/output device interface 1012. The input/output device interface 1012 may also accept input from the optional input device 1028, such as a keyboard, mouse, digital pen, microphone, touch screen, gesture recognition system, voice recognition system, or other input device known in the art.

The memory 1014 may contain computer program instructions (grouped as modules or components in some embodiments) that the processing unit 1006 may execute in order to implement one or more embodiments described herein. The memory 1014 may generally include RAM, ROM and/or other persistent, auxiliary or non-transitory computer-readable media. The memory 1014 may store an operating system 1018 that provides computer program instructions for use by the processing unit 1006 in the general administration and operation of the computing system 1002. The memory 1014 may further include computer program instructions and other information for implementing aspects of the present disclosure. For example, in one embodiment, the memory 1014 may include a user interface module 1016 that generates user interfaces (and/or instructions therefor) for display upon a computing system, e.g., via a navigation interface such as a browser or application installed on a user device 1003.

In some embodiments, the memory 1014 may include one or more modeling components 1020 and model training components 1022, which may be executed by the processing unit 1006 to perform operations according to various embodiments described herein. The modules or components 1020 and/or 1022 may access the model data store 1032 and/or item data store 1030 in order to retrieve the data described above and/or store data. For example, the model data store 1032 may store the trained encoder-decoder model, and optionally data pre-processing components, as well as training data and other model-related data described above. The item data store 1030 may store item data generated by the model, item data to be reviewed/modified by the model, and/or an electronic catalog of items known to the computing system 1002. The data stores 1030 and/or 1032 may be part of the computing system 1002, remote from the computing system 1002, and/or may be a network-based service.

In some embodiments, the network interface 1008 may provide connectivity to one or more networks or computing systems, and the processing unit 1006 may receive information and instructions from other computing systems or services via one or more networks. In the example illustrated in FIG. 10, the network interface 1008 may be in communication with a user device 1003 via the network 1036, such as the Internet. In particular, the computing system 1002 may establish a communication link 1042 with a network 1036 (e.g., using known protocols) in order to send communications to the computing device 1003 and/or another external data source 1001 over the network 1036. Similarly, the computing device 1003 may send communications to the computing system 1002 over the network 1036 via a wired or wireless communication link 1004.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising." "including." "having." and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z." unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:

memory; and at least one computing device configured with computer-executable instructions that, when executed, cause the at least one computing device to:

receive a first input in a first modality, wherein the first modality is image data, wherein the image data of the first input depicts an item;

receive a second input in a second modality, wherein the second modality is text data, wherein the text data of the second input relates to the item;

tokenize the first input, in a first manner selected based on the first modality, to generate a tokenized first input;

tokenize the second input, in a second manner selected based on the second modality, to generate a tokenized second input;

generate a first relatively positioned embedding for the first input that incorporates the tokenized first input and a first token type identifier that identifies the first modality;

generate a second relatively positioned embedding for the second input that incorporates the tokenized second input and a second token type identifier that identifies the second modality;

generate, within a plurality of layers of an encoder, an encoded sequence associated with the item based at least in part on a combination of the first relatively positioned embedding and the second relatively positioned embedding;

provide the encoded sequence associated with the item as input to a decoder that has been jointly trained with the encoder in a task-agnostic manner, wherein the decoder comprises a sequence-to-sequence generative machine learning model; and generate, based on application of the decoder to the encoded sequence associated with the item, one or more textual attributes relating to the item.

2. The system of claim 1, wherein the encoded sequence associated with the item based on the combination of the first relatively positioned embedding and the second relatively positioned embedding is generated based at least in part by applying Text-To-Text Transfer Transformer ("T5") encoding techniques.

3. The system of claim 1, wherein the tokenized first input is generated based at least in part on features identified in the image data by a convolutional neural network.

4. The system of claim 1, wherein the second input includes a prompt within the text data, wherein the one or more textual attributes generated by the decoder represent an answer or response to the prompt.

5. A computer-implemented method comprising:

receiving a first input in a first modality, wherein the first input relates to an item, wherein the first modality is one of text data, image data, audio data or sensor data;

receiving a second input in a second modality, wherein the second input relates to the item, wherein the second modality is different than the first modality;

generating a first embedding representing the first input;

generating a second embedding representing the second input; and generating, based on the first embedding and the second embedding, a textual output sequence associated with the item.

6. The computer-implemented method of claim 5, wherein the textual output sequence comprises at least one of an item attribute, an item title, an item description, an item type classification, or an answer to a question prompt in the text data of the second input.

7. The computer-implemented method of claim 5, wherein the textual output sequence associated with the item comprises information regarding the item that cannot be determined based solely on the first input and cannot be determined based solely on the second input.

8. The computer-implemented method of claim 5, further comprising:

generating a new product page interface comprising three or more fields; and wherein receiving the first input and second input are in response to filling of a first field and second field of the three or more fields on the new product page interface; and wherein the textual output sequence corresponds to a third field of three or more fields.

9. The computer-implemented method of claim 5, wherein the first embedding is based on a plurality of tokens or features determined from the first input, wherein the first embedding includes a first token type identifier that identifies the first modality; and wherein the computer-implemented method further comprises:

generating, within a plurality of layers of an encoder, an encoded sequence associated with the item based on a combination of the first embedding and the second embedding;

providing the encoded sequence associated with the item as input to a decoder that has been jointly trained with the encoder to perform a plurality of sequence-to-sequence tasks; and wherein the textual output sequence is generated based on application of the decoder to the encoded sequence associated with the item.

10. The computer-implemented method of claim 9, wherein the plurality of sequence-to-sequence tasks for which the encoder and the decoder are jointly trained comprises two or more of: item title generation, item attribute correction, item attribute generation, item title completion, item type classification, or input inconsistency detection.

11. The computer-implemented method of claim 9, wherein the encoder and the decoder collectively comprise a sequence-to-sequence generative model that performs classification and detection tasks based on a task-agnostic training of the sequence-to-sequence generative model.

12. The computer-implemented method of claim 9, wherein the encoded sequence provided to the decoder is generated in a hidden layer within the encoder.

13. The computer-implemented method of claim 9, wherein at least one of the first input or the second input comprises a prompt, wherein the prompt dictates at least in part one of (a) a task to be performed by the decoder or (b) a type of output to be generated by the decoder.

14. The computer-implemented method of claim 9, wherein the encoded sequence associated with the item based on the combination of the first embedding and the second embedding is generated based at least in part by applying Text-To-Text Transfer Transformer ("T5") encoding techniques.

15. The computer-implemented method of claim 9 further comprising jointly training the encoder and the decoder to generate text regarding items based on a training dataset comprising, for each individual item of a plurality of items, an image of the individual item and a textual title or description of the individual item.

16. The computer-implemented method of claim 9, wherein the first input comprises image data depicting the item and wherein the plurality of tokens or features determined from the first input comprises features determined based on at least one of: (a) transforming the image data to flattened image patches, (b) utilizing a Vision Transformer (ViT) model, or (c) utilizing a convolutional neural network to extract image features.

17. A non-transitory computer readable medium including computer-executable instructions that, when executed by a computing system, cause the computing system to perform operations comprising:
- receiving a first input in a first modality, wherein the first input relates to an item;
- receiving a second input in a second modality, wherein the second input relates to the item, wherein the second modality is different than the first modality;
- generating a first relatively positioned embedding representing the first input based on a plurality of tokens or features determined from the first input, wherein the first relatively positioned embedding includes a first token type identifier that identifies the first modality;
- generating a second relatively positioned embedding representing the second input based on a plurality of tokens or features determined from the second input, wherein the second relatively positioned embedding includes a second token type identifier that identifies the second modality;
- generating, within a plurality of layers of an encoder, an encoded sequence associated with the item based at least in part on a combination of the first relatively positioned embedding and the second relatively positioned embedding;
- providing the encoded sequence associated with the item as input to a decoder; and
- generating, based on application of the decoder to the encoded sequence associated with the item, a textual output sequence associated with the item.

18. The non-transitory computer readable medium of claim 17, wherein the operations further comprise jointly training the encoder and the decoder to perform a plurality of tasks, wherein a particular task in a given instance is indicated via a portion of input data to the encoder in the given instance.

19. The non-transitory computer readable medium of claim 17, wherein the first input is image data depicting the item, wherein the second input is text data describing the item.

20. The non-transitory computer readable medium of claim 19, wherein the encoded sequence associated with the item is further based in part on a third relatively positioned embedding generated based on a third input in a third modality.

* * * * *